United States Patent [19]

Kreilein et al.

[11] Patent Number: 4,528,337

[45] Date of Patent: Jul. 9, 1985

[54] PROCESS AND APPARATUS FOR MANUFACTURING VINYL CHLORIDE POLYMERS

[75] Inventors: Kurt Kreilein; Hans Geschonke, both of Pulheim; Wolfgang Rummel; Hardo Wiemer, both of Cologne, all of Fed. Rep. of Germany

[73] Assignee: Wacker-Chemie GmbH, Fed. Rep. of Germany

[21] Appl. No.: 604,082

[22] Filed: Apr. 26, 1984

Related U.S. Application Data

[63] Continuation-in-part of Ser. No. 487,607, Apr. 22, 1983, abandoned.

[30] Foreign Application Priority Data

Apr. 27, 1982 [DE] Fed. Rep. of Germany ....... 3215624

[51] Int. Cl.$^3$ .............................................. C08F 2/16
[52] U.S. Cl. ...................................... 526/70; 526/64; 526/68; 526/74; 526/78; 526/88; 526/344.2; 526/345; 526/918
[58] Field of Search ................ 526/88, 344.2, 78, 918, 526/64, 68, 70, 74, 345

[56] References Cited

U.S. PATENT DOCUMENTS 4,377,672  3/1983  Geschonke et al. ......... 526/344.2 X

FOREIGN PATENT DOCUMENTS 156349  5/1952  Australia ............................. 526/88
709919  6/1954  United Kingdom .................. 526/70

OTHER PUBLICATIONS

Chemical Engineering Plant Design, Vilbrandt, 1942, pp. 268–269.
Chemical Engineers' Handbook, Perry et al., 1973, p. 19–12.
Unit Operations of Chemical Engineering, McCabe et al., 1976, pp. 254–257.

*Primary Examiner*—Paul R. Michl
*Assistant Examiner*—S. Babajko
*Attorney, Agent, or Firm*—Charles A. Muserlian

[57] ABSTRACT

A process for the manufacture of vinyl chloride polymers or copolymers by microsuspension polymerization of vinyl chloride or vinyl chloride and up to 30% by weight, based on the total monomer content, of α-olefinically unsaturated monomers copolymerizable with vinyl chloride comprising the steps of:

(1) dispersing the monomer or the monomer mixture in water in the presence of from 0.1 to 3% by weight, based on the total weight of the monomer content, of microsuspension dispersion auxiliaries and from 0.001 to 3% by weight, based on the total weight of the monomer content, of microsuspension monomer - soluble radical - initiators;

(2) homogenizing said dispersion so that monomer droplets mostly having a mean diameter of from 0.1 to 3 μm are obtained;

(3) polymerizing said homogenized dispersion in a vertically elongated reactor area at a preselected elevated temperature and elevated pressure, while (4) maintaining an inert gas cushion over said aqueous polymerization mixture in said reactor area;

(5) during said polymerization withdrawing gas from said inert gas cushion and, inserting a substantially inert gas only slightly soluble in the reaction mixture and substantially free of vinyl chloride into said aqueous polymerization mixture at the lower part of said vertically elongated reactor area in the form of small bubbles so that the partial pressure of said substantially inert gas is from 0.5 to 10 bar and the volume of the gas inserted is, under the reaction conditions, from 1 to 100% of the volume of said vertically elongated reaction area per hour or taking the inert gas from an external supply, the pressure in the reactor held constant and the same amount of gas blown into the autoclave is released; and (6) recovering said vinyl chloride polymer or copolymer resulting in more uniform polymers and an improved space/time yield.

9 Claims, No Drawings

PROCESS AND APPARATUS FOR MANUFACTURING VINYL CHLORIDE POLYMERS

PRIOR APPLICATION

This application is a continuation-in-part of copending, commonly assigned U.S. Pat. application Ser. No. 487,607 filed Apr. 22, 1983, now abandoned.

STATE OF THE ART

It is known that vinyl chloride polymers, which are frequently called "paste PVC", can be manufactured especially advantageously by so-called microsuspension polymerization and are especially suitable for use in plastisols.

A process of this type is described, for example, in U.S. Pat. No. 2,981,722 wherein first, the monomer dispersion persion is manufactured so that, after homogenization has been completed, a small amount of monomer separates from the surface of the reaction mixture and is removed and then the polymerization is carried out in a narrow autoclave, generally called a tubular autoclave, without stirring because of the danger of coalesence and, at the end of polymerization, optionally the resulting finely disperse dispersion is coarsened by stirring which causes agglomeration.

The polymer from the resulting mechanically very poorly stable dispersions is suitable especially for manufacturing pastes but a disadvantage of that process is that the heat of reaction is removed only by convection or thermal conduction which is the reason for carrying out the process in a tubular autoclave having a large surface/volume ratio, and the reaction rate must therefore be kept low. For this reason, the space/time yield is unsatisfactory and a further disadvantage is the high degree of wall incrustation occurring during the process.

If attempts are made to decrease the degree of wall incrustation by increasing the stability of the monomer dispersion by means of relatively high shearing forces during homogenization, the improvement is achieved at the cost of an increase in the proportion of relatively small polymer particles in the product. As a consequence, pastes manufactured therefrom have undesirably high viscosities. Also, the working up of the dispersions on suction-cell filters, which is relatively advantageous with regard to energy consumption, is accordingly rendered more difficult or even impossible. On the other hand, attempts have been made to achieve an increase in the stability of the monomer emulsion by increasing the proportion of the dispersion auxiliary (proportion of emulsifier) in the polymerization recipe. In addition to the resulting increase in cost, the sensitivity to moisture and the water absorption of the polymer is increased which has a negative effect, especially when the pastes are used for protective layers, for coatings and for manufacturing shaped transparent articles.

Although the above-mentioned problems could be considerably reduced by using certain copolymers of monobasic or dibasic carboxylic acids and certain emulsifiers (see, in that respect, U.S. Pat. No. 4,377,672, the disclosure of which can be applied completely also to the present process and is therefore to be considered to be incorporated herein by reference), the polymerization time is still too long by present standards and, in particular, the degree of wall incrustation is still too high. Although it is explained in the above patent that stirring can be carried out, it must be carried out carefully so that the shear rate does not become too high, for example by means of a blade stirrer. In that case, however, the dispersion is not being circulated at a rate which would be necessary for a noticeable shortening of the polymerization time. Apart from the high investment costs for such stirring members, mechanical stirring of that type requires expensive regulation of the speed of the stirrer throughout the entire period of polymerization due to the risk of the dispersion agglomerating or coagulating if stirring is too strong for even only a short period (see, in that respect, DE-PS No. 10 69 387). Furthermore, the quality of the polymers manufactured by the known process is subject to fluctuations which, today, are no longer tolerated by the customer.

OBJECTS OF THE INVENTION

An object of the present inventon is, accordingly, to develop a microsuspension process that is improved with respect to the prior art and yields vinyl chloride polymers having a better and more uniform quality in conjuction with clearly reduced polymerization times, with a higher/space time yield.

Another object of the present invention is the development of a process for the manufacture of vinyl chloride polymers or copolymers by the microsuspension process by polymerization of vinyl chloride or vinyl chloride and up to 30% by weight, based on the total monomer content, of α-olefinically unsaturated monomers copolymerizable with vinyl chloride, essentially comprising the steps of:

(1) dispersing the monomer or the monomer mixture in water in the presence of from 0.1 to 3% by weight, based on the total weight of the monomer content, of microsuspension dispersion auxiliaries and from 0.001 to 3% by weight, based on the total weight of the monomer content, of microsuspension monomer - soluble radical - initiators;

(2) homogenizing said dispersion so that monomer droplets mostly having a mean diameter of from 0.1 to 3 $\mu$m are obtained;

(3) polymerizing said homogenized dispersion in a vertically elongated reaction area at a preselected elevated temperature and elevated pressure, while (4) maintaining an inert gas cushion over said aqueous polymerization mixture in said reaction area;

(5) during said polymerization withdrawing gas from said inert gas cushion and, inserting a substantially inert gas substantially free of vinyl chloride into said aqueous polymerization mixture at the lower part of said vertically elongated reaction area in the form of small bubbles in such a manner that the partial pressure of said substantially inert gas, is at least 0.5 bar and the volume of the gas inserted is, under the reaction conditions, from 1 to 100% of the volume of said vertically elongated reaction area per hour;

(6) during said polymerization blowing inert gas free of vinyl chloride via a gas line to the inserting device at the bottom of the autoclave into said aqueous polymerization mixture, the pressure in the gas line being preferably from 2 to 5 bar above the pressure in the autoclave, this pressure held constant by means of an autoclave pressure regulating valve at the top of the autoclave; and (7) recovering said vinyl chloride polymer or copolymer.

A further object of the invention is to provide an apparatus for the above microsuspension polymerization comprising a jacketed vertically-elongated autoclave having a height to internal cross-section ratio of at least 2.5 and having a dome-shaped top, a gas-collecting device, gas conduct means leading from said dome-shaped top to said gas-collecting device, and a multi-apertured device for inserting gas into the bottom of said autoclave having a feed means supplied with a non-return valve connected to a gas-supply vessel, said autoclave being free of internal obstructions above said multi-apertured device.

These and other objects and advantages of the invention will become more apparent for the following detailed description.

DESCRIPTION OF THE INVENTION

The novel process of the invention for the manufacture of vinyl chloride polymer or copolymer by microsuspension polymerization of vinyl chloride or vinyl chloride and up to 30% by weight, based on the total monomer content, of α-olefinically unsaturated monomers copolymerizable with vinyl chloride, comprises the steps of:

(1) dispersing the monomer or the monomer mixture in water in the presence of from 0.1 to 3% by weight, based on the total weight of the monomer content, of microsuspension dispersion auxiliaries and from 0.001 to 3% by weight, based on the total weight of the monomer content, of microsuspension monomer - soluble radical - initiators;

(2) homogenizing said dispersion so that monomer droplets mostly having a mean diameter of from 0.1 to 3 μm are obtained;

(3) polymerizing said homogenized dispersion in a vertically elongated reactor area at a preselected elevated temperature and elevated pressure, while (4) maintaining an inert gas cushion over said aqueous polymerization mixture in said reactor area;

(5) during said polymerization withdrawing gas from said inert gas cushion and, inserting a substantially inert gas only slightly soluble in the reaction mixture and substantially free of vinyl chloride into said aqueous polymerization mixture at the lower part of said vertically elongated reactor area in the form of small bubbles so that the partial pressure of said substantially inert gas is from 0.5 to 10 bar and the volume of the gas inserted is, under the reaction conditions, from 1 to 100% of the volume of said vertically elongated reaction area per hour or taking the inert gas from an external supply, the pressure in the reactor held constant and the same amount of gas blown into the autoclave is released; and (6) recovering said vinyl chloride polymer or copolymer.

The above objects have been achieved in excellent manner by the invention which is a process for manufacturing vinyl chloride (VC) polymers by polymerizing vinyl chloride by the microsuspension process, optionally together with up to 30% by weight of at least one monomer that is copolymerizable with vinyl chloride. The process essentially comprises three process steps; first, the monomer (mixture) is dispersed in water in the presence of from 0.1 to 3% by weight of customary dispersion auxiliaries and from 0.001 to 3% by weight of customary monomer-soluble radical-forming agents, the amounts referring, in each case, to the total weight of the monomer (mixture); then, in a manner known per se, the resulting dispersion is homogenized so that monomer droplets having a mean diameter of from 0.1 to 3 μm are obtained; and, finally, the homogenized dispersion is polymerized in a vertical autoclave at elevated pressure and elevated temperature.

The process described above is carried out according to the invention so that an inert-gas cushion is maintained over the aqueous polymerization mixture in the autoclave and, during polymerization, gas is drawn off at the head of the reaction vessel, and inert gas free of vinyl chloride, optionally in admixture with gaseous monomer(s), is blown into the lower portion of the reaction vessel so that the partial pressure of the inert gas is at least 0.5 bar and preferably up to 10 bar, especially preferably from 2 to 5 bar, and the volume of the gas fed in at the bottom is, under the reaction conditions, from 1 to 100%, preferably from 5 to 50%, of the autoclave volume per hour. When following the above procedure, surprisingly, there is a noticeable improvement in the product with regard to uniformity between several charges, further reduction in wall incrustation and grit, and the stability of the dispersion and also, owing to improved removal of heat and improved utilization of the cooling capacity, there is a noticeable reduction in the polymerization time required and in the associated reaction-cycle time of the polymerization autoclave utilized, which is preferably a tubular autoclave.

The monomer content of vinyl chloride in the circulating inert gas have to be kept as low as possible to avoid vinyl chloride being blown into the autoclave and condensing therein in the first phase of the polymerization since this has been found to cause scaling and grit formation. The desired effect is caused by stirring by the rising inert gas bubbles bubbling through the reaction mixture. The inert gas introduced should not contain more than 1% by weight of vinyl chloride, preferably 0%.

More particularly therefore, the present invention involves a process for the manufacture of vinyl chloride polymers or copolymers according to the microsuspension process by the polymerization of vinyl chloride or vinyl chloride and up to 30% by weight, based on the total monomer content, of α-olefinically unsaturated monomers copolymerizable with vinyl chloride, essentially comprising the steps of:

(1) dispersing the monomer or the monomer mixture in water in the presence of from 0.1 to 3% by weight, based on the total weight of the monomer content, of microsuspension dispersion auxiliaries and from 0.001 to 3% by weight, based on the total weight of the monomer content, of microsuspension monomer-soluble radical initiators;

(2) homogenizing said dispersion so that monomer droplets mostly having a mean diameter of from 0.1 to 3 μm are obtained;

(3) polymerizing said homogenized dispersion in a vertically elongated reaction area at a preselected elevated temperature and elevated pressure, while (4) maintaining an inert gas cushion over said aqueous polymerization mixture in said reaction area;

(5) during said polymerization withdrawing gas from said inert gas cushion and, inserting a substantially inert gas into said aqueous polymerization mixture at the lower part of said vertically elongated reaction area in the form of small bubbles so that the partial pressure of said substantially inert gas is at least 0.5 bar and the volume of the gas inserted is, under the reaction conditions, from 1 to 100% of the volume of said vertically elongated reaction area per hour; and (6) recovering said vinyl chloride polymer or copolymer.

In an embodiment which is especially preferred because of its relatively simple operation, the gas drawn off at the head of the autoclave is conveyed in a loop and blown in again at the bottom of the autoclave after removal of any vinyl chloride by a condensor and a separator. The gas drawn off at an internal gas pressure of about 3 bar contains about 20% by weight of vinyl chloride which has been found to cause heavy scaling with reduced effectiveness of the cooling system and grit formation.

With the process of the invention, it is possible to manufacture dispersions of vinyl chloride homopolymers and vinyl chloride copolymers which are very well suited for preparing organosols or plastisols, and which, herein, are referred to, for simplicity, as PVC or polyvinyl chloride. When manufacturing the said copolymers, it is possible to use concomitantly other ethylenically-unsaturated compounds copolymerizable with vinyl chloride in amounts of up to 30% by weight, preferably up to 5% by weight, based, in each case, on the total content of monomers. Generally, however, vinyl chloride homopolymers are especially preferred.

Examples of suitable comonomers are vinyl esters of carboxylic acids of the formula RCOOH wherein R is hydrogen or branched-chain or straight-chain alkyl of 1 to 19 carbon atoms, for example vinyl formate, vinyl (n-or iso)butyrate, preferably vinyl acetate and vinyl propionate; $C_1$ to $C_8$ alkyl esters of $\alpha$, $\beta$-ethylenically unsaturated carboxylic acids having from 3 to 6 carbon atoms in the acyl radical, particularly lower alkyl lower alkenoates, for example methyl, ethyl, (n-or iso)propyl or (n-, sec.-or tert.-)butyl acrylate, methacrylate, or crotonate; vinyl halides such as vinyl fluoride and vinyl bromide; vinylidene halides, for example vinylidene chloride; $\alpha$-olefins, for example propylene and, especially, ethylene; itaconic acid, maleic acid and fumaric acid monesters and/or diesters with saturated alkanols of 1 to 8 carbon atoms; vinyl ethers, particularly vinyl lower alkyl ethers; and (meth)acrylonitrile.

According to the invention, the PVC polymers can be manufactured according to recipes that are already known. Reference is made here especially to U.S. Pat. Nos. 2,981,722 and 4,377,672 mentioned above, the relevant disclosures of which are incorporated by reference to form part of the present application. The details in those patents relating to the type and amount of oil-soluble dispersion auxiliaries and water-soluble dispersion auxiliaries such as emulsifiers, protective colloids or special polymers containing carboxy groups, radical initiators and water, apply especially also to the present process, and therefore, for the sake of conciseness of the present description, repetition can, to a large extent, be dispensed with. It is noteworthy that the present process is suitable even for dispersions which are poor as to dispersion auxiliaries (0.5 to 1% by weight, based on the monomer). Customary additives such as buffer systems and regulators can obviously be used concomitantly also in customary amounts.

It has already been mentioned in the introduction that first the reactants and reaction auxiliaries are dispersed or dissolved in a customary manner in water, preferably in a monomer/water weight ratio of from 0.4:1 to 2:1, especially from 0.6:1 to 1.5:1, so that a uniform preliminary emulsion is produced. The preliminary emulsion is then homogenized in at least one homogenizing stage, optionally with interposed stoppages, until the monomer droplets have a mean diameter of from 0.1 to 3 $\mu$m. In that respect, deviations are naturally possible but the majority of particles should be of that diameter.

The homogenized reaction mixture is then introduced into the reaction vessel, preferably a tubular autoclave, that is to say a very narrow autoclave having a large surface area/volume ratio and customarily, the reactor has external cooling (jacket cooling). Before being charged with the homogeneous reaction mixture, the autoclave has preferably already been rinsed free of oxygen and, especially preferably has been filled with inert gas. The homogenized dispersion can also, however be introduced into an evacuated vessel. No later than immediately after the filling, an inert gas (that is to say a gas that preferably does not interfere with the polymerization reaction itself or interferes to only an extremely small extent, and that also does not react to any appreciable extent with individual components of the reaction mixture, and that is preferably only slightly soluble in the reaction mixture) is admitted into the autoclave. Examples of gases of this type are fluorochloro-hydrocarbons [so-called Freons (registered Trade Mark) or Frigens (registered Trade Mark) or the like], noble gases, and/or nitrogen, which is preferred for reasons of cost and because it is readily available.

Customarially, an inert-gas partial pressure of 0.5 bar is sufficient since lower pressures normally do not result in the surprisingly advantages of the process of the invention. On the other hand, an increase in the inert-gas partial pressure to more than 10 bar generally does not bring any further advantages but, naturally, is possible in principle (for example up to 20 or 40 bar). The upper limit is set virtually only by factors relating to the apparatus. Preferably, inert-gas partial pressures of from 2 to 5 bar are used.

After the autoclave has been filled, it is possible immediately to start to draw off at the head of the autoclave a portion of the gas in the dome of the autoclave and to blow gas in at the bottom of the vessel so that the inert-gas pressure remains within the given range, the gas consisting substantially of inert gas but optionally containing also gaseous monomer in the second half of the polymerization so that all monomer is absorbed by the polymer at once to avoid scale and grit formation. The pressure can be varied within the given pressure range by controlling the amount of gas drawn off and the amount of gas blown in, that is to say, if desired, it can be raised and/or lowered several times. Preferably, however, it is maintained constant during the major part of the reaction period.

The gaseous monomer mentioned above is preferably in equilibrium with the associated partial pressure in the reaction vessel.

The 'gas-bubble stirring' described may alternatively, however, be commenced at any desired later stage, for example after the mixture has been heated to the reaction temperature or after the reaction has begun. Generally, the 'gas-bubble stirring' is preferably commenced immediately after the reactor has been filled and is continued until the polymerized dispersion is removed, but at least until polymerization is complete. A preferred apparatus that can be used for the process according to the invention comprises a vertical autoclave having a height/internal diameter ratio of at least 2.5, especially a tubular autoclave, that is to say having an extremely high ratio of height to internal diameter (H/D of from approximately 5 to 10, or even larger). The autoclave may be connected at the dome, via conduits, to a collecting vessel and a device for purifying the exhaust gas. The autoclave may likewise be connected at the bottom, via at least one bottom valve and/or at least one gas-inlet tube and/or at least one gas-inlet ring and/or via a perforated plate, the gas feed of which is provided in each case with a non-return valve, to a gas-supply vessel from which the feed gas is supplied.

More particularly, the autoclave of the present invention comprises a jacketed vertically-elongated autoclave having a height to internal cross-section ratio of at least 2.5 and having a dome-shaped top, a gas-collecting device, gas conduct means leading from said dome-shaped top via a condensor and separator to remove vinyl chloride to said gas-collection device, and a multiapertured device for insertion gas into the bottom of said autoclave having a feed means supplied with a non-return valve connected to a gas-supply vessel, said autoclave being free of internal obstruction above said multi-apertured device.

In a preferred embodiment, however, the gas drawn off is not released after purification, but is recompressed using a device customary for this purpose, for example a gas pump, such as a diaphragm or piston pump for gas, and introduced after removal of condensed vinyl chloride with a separator via conduits into the gas-supply vessel mentioned. If the inert gas is conveyed in a loop in the preferred manner, a collecting and/or supply vessel can be dispensed with. To maintain a relatively uniform gas flow, however, preferably the supply vessel, or an air chamber, is switched into or at the gas loop at least from time to time. The inert gas can be stored in the vessel, for example, also after polymerization is complete so that it can be used again for further reaction cycles. This is preferred, for example, for reasons of environmental hygiene and work hygiene and because it renders it unnecessary to purify relatively large amounts of gas. To compensate for losses of gas that may nevertheless occur, a customary feed device is, of course, provided which does not require further explanation.

The gas-compression device is of course designed for the operating pressure of the reaction system and should increase the pressure of the gas to such an extent that the hydrostatic pressure of the reaction mixture is at least exceeded, preferably just exceeded. This ensures that a uniform gas flow is blown in at the bottom of the autoclave so that the dispersion is thoroughly mixed by the gas bubbles rising in the reaction mixture in an extremely careful manner without shearing stress and, preferably to a large extent uniformly over the whole cross-section of the reactor.

As mentioned briefly above, the gas is blown into the lower portion of the autoclave via a multi-apertured device such as bottom valves, gas-inlet tubes, gas-distributor plates (for example, perforated floors) and/or gas-inlet rings (generally a hollow ring having uniformly spaced apertures). Generally, in the case of tubular autoclaves, a single arrangement of that type, especially a bottom valve, a perforated plate or a gas-inlet tube, is adequate with the gas being blown in preferably directly above or at the floor (preferably at the lowest point of the vessel). Further arrangements can be attached at other places on the autoclave.

In determining the position of the blowing-in arrangement—and this applies to all devices—it is important to ensure that no dead spaces occur, that is to say regions within the reaction mixture that remain unstirred. The optimum position for blowing the gas in depends on the geometrical shape of the reaction vessel in each case and on the viscosity of the stirred medium, but it can readily be determined in a few experiments (for example in a model or on a laboratory scale) by the man skilled in the art. Normally, that position is in the lowest quarter of the reactor. A possible example of an autoclave having an H/D ratio of at least 2.5 may be mentioned: a bottom valve in the center of the floor of the autoclave and a centrally arranged multi-apertured gas-inlet ring having a dimeter of approximately two-thirds of the internal diameter D of the autoclave arranged at such a height above the floor that its distance from the floor corresponds to its distance from the cylindrical side wall of the autoclave.

In the case of predetermined amounts of gas per unit time, the internal diameter of the gas inlet openings into the reaction medium should preferably be of such dimensions that no jet effect, and thus no gas stream, occurs in the liquid, but that preferably stirring is achieved solely by the rising gas bubbles bubbling through the reaction mixture. The supplies to the above-mentioned gas-inlet openings may obviously be built in vertically, from top or bottom, horizontally or at an angle, their cross-section and also the size of the gas-inlet aperture(s) and the dimensions of the remaining inert-gas circulating apparatus depending on the size of the autoclave and amount of gas being pumped round. Those dimensions can be optimized by the man skilled in the art using a few simple tests. In a preferred embodiment of the invention, the number of gas inlet openings is from 1 to 10, more preferably from 1 to 3. Their internal diameters which can be the same or different, preferably the same, are preferably from about 5 mm to about 50 mm. When only using one gas-inlet, the opening is preferably in the center of the reactor.

A cooler, preferably in connection with a separator (for example, for condensed monomers), is built into the exhaust-gas line from the dome of the autoclave to the gas-collecting vessel or to the suction of the gas compressor to remove vinyl chloride from the recycled gas discussed above.

According to another especially preferable embodiment of the invention, the inert gas is supplied from a central inert gas supply via a gas line, a gas metering device and a non-return valve to the inserting device at the bottom of the autoclave. The pressure in the gas-line is preferably from 2 to 5 bar above the pressure in the autoclave. The said pressure in the autoclave is according to this preferred embodiment of the invention held constant by means of an automatic pressure regulating valve at the top of the autoclave. Exhaust gas is released through this valve and conducted therefrom through a pipe connected therewith to e.g. a gasometer or to a gas purification plant. The vinyl chloride can be recovered from the exhaust gas by low temperature condsenation and additionally by adsorption in active coal. This embodiment is particularly advantageous when stirring with small amounts of gas in a gentle manner.

Surprisingly, virtually no foam is formed and also the amount of monomers conveyed concomitantly is generally low. In addition to the recipes mentioned, it is pointed out that mixtures of rapidly dissociating and slowly dissociating initiators especially are advantageous for the process of the invention, the weight ratio of those initiators preferably being between 10 : 1 and 1:10.

Examples of suitable combinations are mixtures of dilauroyl peroxide with di-2-ethylhexyl peroxidicarbonate, with bis-3,5,5-trimethylhexanoyl peroxide, with didecanoyl peroxide or with 2,2'-azo-bis(2,4-dimethyl)-valeronitrile. The compounds mentioned may naturally be used also in the form of dispersions according to DE-A No. 26 29 467 and/or individually.

When polymerization is complete, the residual monomer content may, if desired, be reduced in a known manner. As examples of suitable processes, reference is made to U.S. Pat. application Ser. No. 133,419 filed Mar. 24, 1980, now abandoned and U.S. Pat. No. 4,128,516. The polymer can be obtained from the polymer dispersion according to known drying methods, for example by spray drying or by working up on suction-cell filters.

In a preferred embodiment because of its simplicity, inert gas is taken from an external supply means and the pressure is kept constant by the automatic valve during the entire polymerization and there is no gas recirculation. The reaction is stopped when the vinyl chloride partial pressure falls to 3 to 4 bar.

When the inert gas is recirculated with use of a monomer condensor and a separator, a substantial constant amount of inert gas is used resulting in a substantially constant inert gas pressure for the whole reaction and the overall pressure remains substantially constant until the vinyl chloride pressure drops at the end of the reaction. Super critical conditions should always be avoided.

The polymers manufactured by the invention can be worked up with customary plasticizers and customary additives such as stabilizers, etc., to form plastisols, and they correspond in their properties at least to the products that have been obtained according to known processes by polymerization of homogenized monomer dispersions and subsequent removal of coarse portions.

In contrast to those known processes, the process of the invention produces, in higher space/time yields, PVC of more uniform quality with, owing to a decrease in the degree of wall incrustation and a reduction in the proportion of grit, few losses of polymer that does not meet the specification, whereby generally improved latex stability is also achieved. Owing to the lower degree of wall incrustation, it is even possible to carry out the process of the invention not only, as preferred, discontinuously, but also semi-continuously or even in a continuous cycle.

The following examples and comparison tests explain the process in detail. Unless otherwise stated, the amounts and percentages mentioned refer to weight.

COMPARISON TEST A 1260 kg of vinyl chloride together with 1300 kg of a 1% aqueous ammoniacal solution (pH=9.5) of hydroxylated $C_{12}$–$C_{20}$ fatty acids and 3 kg of dilauroyl peroxide were converted with a homogenizer into a finely dispersed vinyl chloride-in-water emulsion, the monomer droplets of which mostly had diameters within the range of from 0.1 μm to 3 μm.

The monomer emulsion was introduced into an evacuated tubular autoclave (H=6 m, D=0.8 m) and heated to 50° C. 15 hours after the internal temperature had been reached, polymerization was complete which could be detected by the drop in pressure. The pressure was released and the polyvinyl chloride latex was drained off. The latex was stable, contained a small amount of coagulate and had a solids content of 47%.

The autoclave wall was uniformly coated with a 0.5 cm thick incrustation, which had to be removed by pressurized-water cleaning. The latex was degassed and was worked up by suction filtration and subsequent drying of the filter cake. The product had a K-value according to Fikentscher of 70 and the paste viscosity of the powder, with diethylhexyl phthalate in a weight ratio of 60:40, was 2500 mPas after 24 hours at a shear rate of 1.4 $s^{-1}$. The wall coating removed by high-pressure wastewater cleaning weighed 18 kg when wet.

EXAMPLE 1

The same polymerization mixture as described in Comparison test A was prepared and polymerized under the same conditions except that this time the homogenized mixture was introduced into the autoclave flooded with nitrogen so that, under the polymerization conditions, there was a nitrogen partial pressure of 3 bar, and, according to the invention, during polymerization, the inert gas was conveyed in a loop equipped with a condensor and a separator to remove vinyl chloride through the polymerization mixture, by means of a diaphragm pump for gas in an amount of 10% of the autoclave volume per hour. 11 hours after the desired temperature had been reached, polymerization was complete. The pressure was released and the latex was drained off. After being degassed, the latex was stable, contained no coagulate, and had a solids content of 48%. The wall of the autoclave was coated by a thin whitish layer of latex residue and could be cleaned by simple rinsing with water. There was no wall incrustation requiring removal by pressurized-water cleaning and the autoclave was reused, without previous pressurized-water cleaning, for the same process according to the invention and with the same result.

In each case, the latex residue weighed 120 g (weighed wet).

The latices from the two polymerizations carried out according to the process of the invention, one after the other without pressurized-water cleaning of the autoclave, were worked up as described in Comparison test A. K-values of 70 and paste viscosities of 2400 and 2500 mPas were found. The example shows that, according to the process of the invention, a surprising improvement in the space/time yield is achieved without any alteration in the properties of the product while avoiding wall incrustations that can be removed only by pressurized-water cleaning.

COMPARISON TEST B

The same polymerization mixture as described in Comparison test A was prepared, and polymerized and worked up under the same conditions except that, instead of 3 kg of dilauroyl peroxide, only 2.5 kg of dilauroyl peroxide were used together with 0.25 kg of di-2-ethylhexyl peroxidicarbonate. Polymerization was complete 14 hours after the desired temperature had been reached, and the latex was stable, contained almost no coagulate and had a solids content of 46%. The wall of the autoclave was coated with an approximately 0.5 cm thick polymer crust (approximately 19 kg) and had to be cleaned using pressurized water. The K-value of the product was 70 and the paste viscosity was 2600 mPas.

EXAMPLE 2

The same polymerization mixture as described in Comparison test B was prepared, and was polymerized and worked up under the conditions according to the invention using an inert-gas cushion and recirculating the inert gas as described in Example 1. 9 hours after the internal temperature had been reached, polymerization was complete and, after the latex had been drained off, the autoclave was reused without pressurized-water cleaning (only after rinsing with water) using a charge identical to the first charge and with the same result. The latices were stable, contained no coagulate, and had solids contents of 47 and 46%. The K-values were 70 and the paste viscosities were 2500 mPas. The examples show that, according to the process of the invention, polymerization times similar to those of the conventional suspension process were achieved.

COMPARISON TEST C

The same polymerization mixture as described in Comparison test A was prepared and polymerized in a 3 cubic meter conventional autoclave. The autoclave was provided with a blade stirrer rotating at 40 min$^{-1}$. 13 hours after the internal temperature has been reached, polymerization was complete which could be detected by the drop in pressure. The latex was only slightly stable and coagulated during degassing. The wall incrustation obtained after cleaning the autoclave with high-pressure water weighed 28 kg. The product was not suitable for the formation of a paste.

This comparison example demonstrates that with a conventional reactor as e.g. used in the process of U.S. Pat. No. 4,377,672, stirring of the polymerization recipe, even slowly, caused intense coagulation. However, with "gas-bubble" stirring according to Example 1, excellent results were obtained with an improved space/time yield.

The "gas-bubble stirring" of the invention is also suitable when manufacturing shear sensitive latices of other ethylenically unsaturated monomers, for example of the abovementioned comonomers alone or in admixture, and with or without vinyl chloride, according to the emulsion or microsuspension process.

The preceding specific embodiments are illustrative of the practice of the invention. It is to be understood however that other expedients known to those skilled in the art or described herein may be employed without departing from the spirit of the invention or the scope of the appended claims.

We claim:

1. A process for the manufacture of vinyl chloride polymer or copolymer by microsuspension polymerization of vinyl chloride or vinyl chloride and up to 30% by weight, based on the total monomer content, of α-olefinically unsaturated monomers copolymerizable with vinyl chloride comprising the steps of:
   (1) dispersing the monomer or the monomer mixture in water in the presence of from 0.1 to 3% by weight, based on the total weight of the monomer content, of microsuspension dispersion auxiliaries selected from the group consisting of emulsifiers, protective colloids and polymers containing carboxyl groups and from 0.001 to 3% by weight, based on the total weight of the monomer content, of microsuspension monomer-soluble radical-initiators;
   (2) homogenizing said dispersion so that monomer droplets mostly having a mean diameter of from 0.1 to 3 μm are obtained,
   (3) polymerizing said homogenized dispersion in a vertically elongated reactor area at a preselected elevated temperature and elevated pressure, while
   (4) maintaining an inert gas cushion over said aqueous polymerization mixture in said reactor area;
   (5) during said polymerization withdrawing gas from said inert gas cushion and, inserting an inert gas only slightly soluble in the reaction mixture and containing less than 1% by weight of vinyl chloride into said aqueous polymerization mixture at the lower part of said vertically elongated reactor area in the form of small bubbles, so that the partial pressure in the reactor of the said inert gas is from 0.5 to 10 bar and the volume of the gas inserted is, under the reaction conditions, from 1 to 100% of the volume of said vertically elongated reaction area per hour, the pressure in the reactor held constant and the same amount of gas blown into the autoclave is released; and
   (6) recovering said vinyl chloride polymer or copolymer, wherein no mechanical agitation of the dispersion takes place during polymerization.

2. The process of claim 1 wherein the partial pressure of said inert gas inserted in step 5 is from 2 to 5 bar.

3. The process of claim 1 wherein said gas withdrawn from said inert gas cushion is conveyed in a loop and inserted into said aqueous polymerization mixture after removal of vinyl chloride therefrom.

4. The process of claim 2 wherein said gas withdrawn from said inert gas cushion is conveyed in a loop and inserted into said aqueous polymerization mixture after removal of vinyl chloride therefrom.

5. The process of claim 1 wherein the volume of the gas inserted is from 5 to 50% of the volume of the reaction area per hour.

6. The process of claim 2 wherein the volume of the gas inserted is from 5 to 50% of the volume of the reaction area per hour.

7. The process of claim 3 wherein the volume of the gas inserted is from 5 to 50% of the volume of the reaction area per hour.

8. The process of claim 4 wherein the volume of the gas inserted is from 5 to 50% of the volume of the reaction area per hour.

9. The process of claim 1 wherein said vertically elongated reaction area has a substantially circular cross-section.

* * * * *